United States Patent
Mefford

(10) Patent No.: US 10,681,303 B2
(45) Date of Patent: Jun. 9, 2020

(54) MULTI-CAMERA SERIAL VIDEO DATA CONVERSION FOR GRAPHICS PROCESSING UNIT (GPU) INTERFACE

(71) Applicant: The Boeing Company, Chicago, IL (US)

(72) Inventor: David Keith Mefford, Brownsboro, AL (US)

(73) Assignee: The Boeing Company, Chicago, IL (US)

( * ) Notice: Subject to any disclaimer, the term of this patent is extended or adjusted under 35 U.S.C. 154(b) by 11 days.

(21) Appl. No.: 15/907,089

(22) Filed: Feb. 27, 2018

(65) Prior Publication Data

US 2019/0268564 A1    Aug. 29, 2019

(51) Int. Cl.
*H04N 5/917* (2006.01)
*H04N 7/12* (2006.01)
*H04N 11/02* (2006.01)

(52) U.S. Cl.
CPC .............. *H04N 5/917* (2013.01); *H04N 7/12* (2013.01); *H04N 11/02* (2013.01)

(58) Field of Classification Search
CPC ................................. H04N 5/917; H04N 7/12
See application file for complete search history.

(56) References Cited

U.S. PATENT DOCUMENTS

2010/0111489 A1*   5/2010   Presler .................. H04N 5/225
                                                    386/278

OTHER PUBLICATIONS

Maxim integration "Designing the Car of the Future.", CES 2017, (Year: 2017).*

* cited by examiner

*Primary Examiner* — Girumsew Wendmagegn
(74) *Attorney, Agent, or Firm* — Haynes and Boone LLP

(57) ABSTRACT

Systems, methods, and apparatus for converting serial video data for a graphics processing unit (GPU) interface are disclosed. In one or more embodiments, a disclosed method comprises receiving, by each of a plurality of gigabit multimedia serial link (GMSL) conversion modules, n-bit length serial video data from a plurality of high-resolution cameras respectively. The method further comprises converting, by each of the GMSL conversion modules, the n-bit length serial video data to m-bit length serial GMSL video data, where n is equal to twice m. Also, the method comprises receiving, by a GMSL to camera series interface (CSI) conversion unit, the m-bit length serial GMSL video data from each of the GMSL conversion modules. Further, the method comprises converting, with the GMSL to CSI conversion unit, the m-bit length serial GMSL video data to m-bit length serial CSI video data, which is compatible with the GPU interface.

20 Claims, 7 Drawing Sheets

MULTI-CAMERA SERIAL VIDEO DATA CONVERSION FOR GRAPHICS PROCESSING UNIT (GPU) INTERFACE

FIELD

The present disclosure relates to video data conversion. In particular, it relates to multi-camera serial video data conversion for a graphics processing unit (GPU) interface.

BACKGROUND

Currently, cameras capable of directly interfacing with a graphics processing unit's (GPU's) specific data bus are high pixel count, high data rate cameras. However, these cameras lack sufficient optical resolution at ranges required by applications for autonomous vehicles. Autonomous vehicle applications, including space-based applications, require the use of long-range cameras (e.g., high definition (HD) cameras) that are able to operate at a high optical resolution. However, these higher caliber cameras are in video formats that are not commensurate of the data bus of a GPU (e.g., an Nvidia TX1 GPU).

Currently, conventional solutions for interfacing cameras with high optical resolution with GPUs involve the use of field-programmable gate arrays (FPGAs). In particular, these solutions employ multiple FPGAs to convert each video stream, and a larger FPGA to encode the data at a less efficient compression method (e.g., H.264/MPEG-4 advanced video coding (AVC)) than utilized by GPUs (e.g., H.265/high efficiency video coding (HEVC)). These solutions require multiple FPGA sets for each camera's video stream, and are inefficient and costly.

There is therefore a need for an improved technique for interfacing cameras with high optical resolution with GPUs.

SUMMARY

The present disclosure relates to a method, system, and apparatus for multi-camera serial video data conversion for a graphics processing unit (GPU) interface. In one or more embodiments, a method for converting serial video data for a GPU interface comprises receiving, by each of a plurality of gigabit multimedia serial link (GMSL) conversion modules, n-bit length serial video data from a plurality of high-resolution cameras respectively. The method further comprises converting, by each of the GMSL conversion modules, the n-bit length serial video data to m-bit length serial GMSL video data. In one or more embodiments, n is equal to twice m. Also, the method comprises receiving, by a GMSL to camera series interface (CSI) conversion unit, the m-bit length serial GMSL video data from each of the GMSL conversion modules. Further, the method comprises converting, with the GMSL to CSI conversion unit, the m-bit length serial GMSL video data to m-bit length serial CSI video data, which is compatible with the GPU interface.

In one or more embodiments, the converting, by each of the GMSL conversion modules, of the n-bit length serial video data to the m-bit length serial GMSL video data comprises receiving, by a de-serializer of each of the GMSL conversion modules, the n-bit length serial video data; de-serializing, with the de-serializer, the n-bit length serial video data to produce n-bit length parallel video data; converting, with a multiplexer/first-in first-out (MUX/FIFO) of each of the GMSL conversion modules, the n-bit length parallel video data to m-bit length parallel video data; and serializing and converting, with a GMSL serializer of each of the GMSL conversion modules, the m-bit length parallel video data to produce m-bit length serial GMSL video data.

In at least one embodiment, each of the high-resolution cameras is a high definition-serial data interface (HD-SDI) camera. In some embodiments, n is equal to 20, and m is equal to 10. In one or more embodiments, at least one of the high-resolution cameras is mounted to a vehicle. In some embodiments, the vehicle is an autonomous vehicle. In at least one embodiment, the vehicle is an airborne vehicle, a space vehicle, a terrestrial vehicle, or a marine vehicle.

In one or more embodiments, each of the plurality of GMSL conversion modules are located proximate the plurality of high-resolution cameras respectively. In some embodiments, the plurality of GMSL conversion modules are located proximate the GMSL to CSI conversion unit. In at least one embodiment, the GMSL to CSI conversion unit is located proximate the GPU interface.

In at least one embodiment, a system for converting serial video data for a GPU interface comprises a plurality of high-resolution cameras. The system further comprises a plurality of GMSL conversion modules to each receive n-bit length serial video data from the plurality of high-resolution cameras respectively, and to each convert the n-bit length serial video data to m-bit length serial GMSL video data. In one or more embodiments, n is equal to twice m. Also, the system comprises a GMSL to CSI conversion unit to receive the m-bit length serial GMSL video data from each of the GMSL conversion modules, and to convert the m-bit length serial GMSL video data to m-bit length serial CSI video data, which is compatible with the GPU interface.

In one or more embodiments, each of the GMSL conversion modules comprises: a de-serializer to receive the n-bit length serial video data and to de-serialize the n-bit length serial video data to produce n-bit length parallel video data; a multiplexer/first-in first-out (MUX/FIFO) to convert the n-bit length parallel video data to m-bit length parallel video data; and a GMSL serializer to serialize and convert the m-bit length parallel video data to produce m-bit length serial GMSL video data.

In at least one embodiment, a system for converting serial video data for a GPU interface comprises a high-resolution camera. The system further comprises a GMSL conversion module to receive n-bit length serial video data from the high-resolution camera, and to convert the n-bit length serial video data to m-bit length serial GMSL video data. In one or more embodiments, n is equal to twice m. Also, the system comprises a GMSL to CSI conversion unit to receive the m-bit length serial GMSL video data from the GMSL conversion module, and to convert the m-bit length serial GMSL video data to m-bit length serial CSI video data, which is compatible with the GPU interface.

The features, functions, and advantages can be achieved independently in various embodiments of the present disclosure or may be combined in yet other embodiments.

DRAWINGS

These and other features, aspects, and advantages of the present disclosure will become better understood with regard to the following description, appended claims, and accompanying drawings where:

DESCRIPTION

Figure 1:
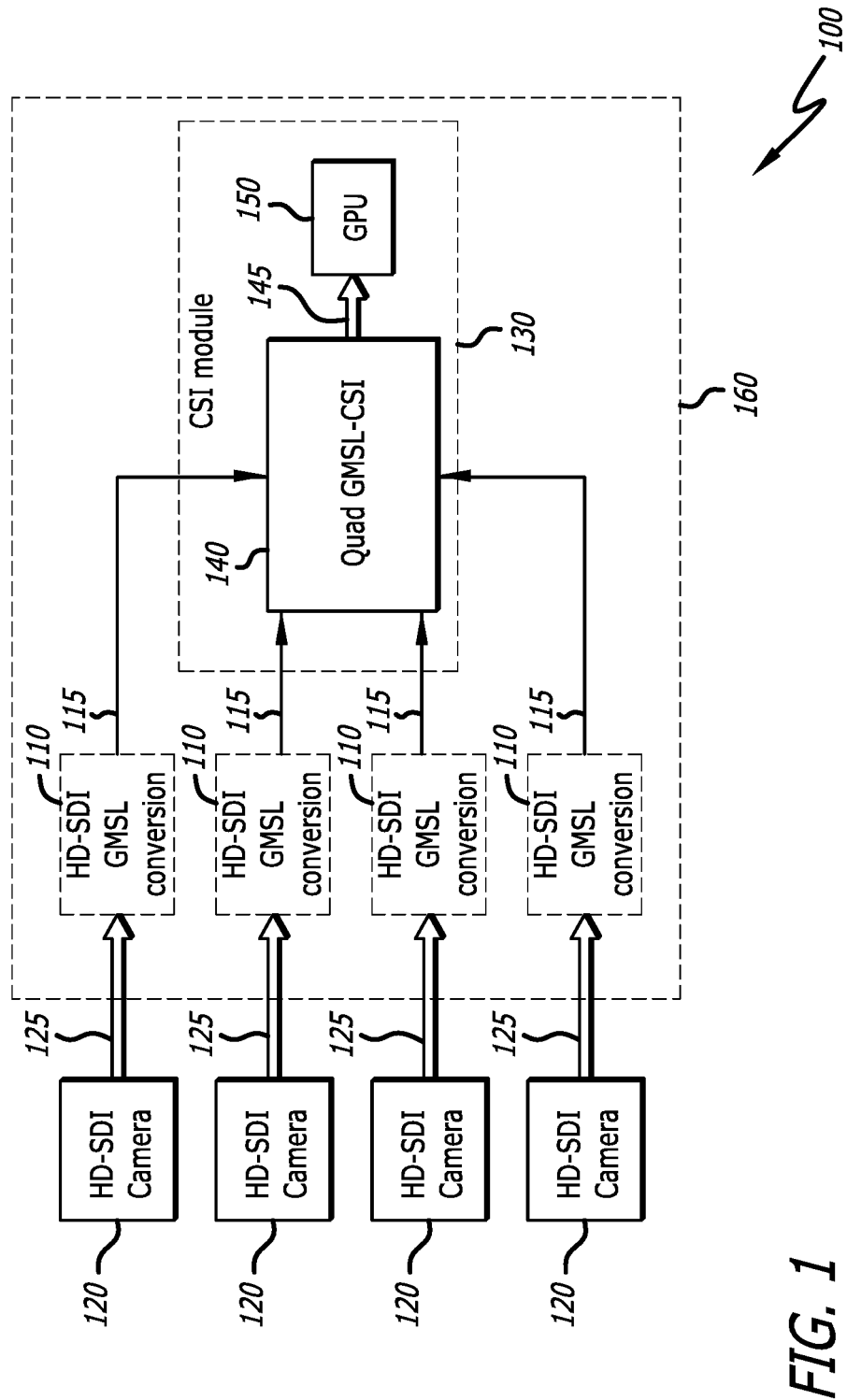
FIG. 1 is a diagram showing the disclosed system for multi-camera serial video data conversion for a graphics processing unit (GPU) interface, where gigabit multimedia serial link (GMSL) conversion modules are located proximate the camera serial interface (CSI) module, in accordance with at least one embodiment of the present disclosure.

The methods and apparatus disclosed herein provide an operative system for multi-camera serial video data conversion for a graphics processing unit (GPU) interface. In one or more embodiments, the system of the present disclosure provides a solution to convert serial video data from high-resolution cameras (e.g., high definition-serial digital interface (HD-SDI) cameras) into a format compatible with a GPU for high data, multi-camera video processing (e.g., utilizing H.265/high efficiency video coding (HEVC)).

As previously mentioned above, currently, cameras capable of directly interfacing with a GPU's specific data bus are high pixel count, high data rate cameras. However, these cameras lack sufficient optical resolution at ranges required by applications for autonomous vehicles. Autonomous vehicle applications, including space-based applications, require the use of long-range cameras (e.g., HD-SDI cameras) that are able to operate at a high optical resolution. However, these higher caliber cameras are in video formats that are not commensurate of the data bus of a GPU (e.g., an Nvidia TX1 GPU).

Conventional solutions for interfacing cameras with high optical resolution with GPUs involve the use of field-programmable gate arrays (FPGAs). In particular, these solutions employ multiple FPGAs to convert each video stream, and a larger FPGA to encode the data at a less efficient compression method (e.g., H.264/MPEG-4 advanced video coding (AVC)) than utilized by GPUs (e.g., H.265/high efficiency video coding (HEVC)). These solutions require multiple FPGA sets for each camera's video stream, and are inefficient and costly.

The system of the present disclosure provides a more streamlined and less expensive solution for interfacing high-resolution cameras (e.g., HD-SDI cameras) with a GPU for video processing. In particular, the system of the present disclosure provides for the conversion of serial video data (e.g., 20-bit length serial video data in HD-SDI protocol) from high-resolution cameras (e.g., HD-SDI cameras) into a GPU compatible format (e.g., 10-bit length serial video data in camera series interface (CSI) protocol) for direct processing by a GPU.

In the following description, numerous details are set forth in order to provide a more thorough description of the system. It will be apparent, however, to one skilled in the art, that the disclosed system may be practiced without these specific details. In the other instances, well known features have not been described in detail so as not to unnecessarily obscure the system.

Embodiments of the present disclosure may be described herein in terms of functional and/or logical components and various processing steps. It should be appreciated that such components may be realized by any number of hardware, software, and/or firmware components configured to perform the specified functions. For example, an embodiment of the present disclosure may employ various integrated circuit components (e.g., memory elements, digital signal processing elements, logic elements, look-up tables, or the like), which may carry out a variety of functions under the control of one or more processors, microprocessors, or other control devices. In addition, those skilled in the art will appreciate that embodiments of the present disclosure may be practiced in conjunction with other components, and that the system described herein is merely one example embodiment of the present disclosure.

For the sake of brevity, conventional techniques and components related to video data processing systems, and other functional aspects of the system (and the individual operating components of the systems) may not be described in detail herein. Furthermore, the connecting lines shown in the various figures contained herein are intended to represent example functional relationships and/or physical couplings between the various elements. It should be noted that many alternative or additional functional relationships or physical connections may be present in an embodiment of the present disclosure.

FIG. 1 is a diagram showing the disclosed system 100 for multi-camera serial video data conversion for a graphics processing unit (GPU) 150 interface, where gigabit multi-media serial link (GMSL) conversion modules 110 are located proximate the camera serial interface (CSI) module 130, in accordance with at least one embodiment of the present disclosure. In this figure, the four (4) GMSL conversion modules 110 along with the CSI module 130 are housed within a hardware enclosure 160. The CSI module 130 comprises a GMSL to CSI conversion unit (e.g., a Quad GMSL-CSI-2 (Max9286) integrated circuit (IC) chip) 140 and a GPU (e.g., an Nvidia TX1 GPU module) 150 mounted on a carrier card (e.g., a daughterboard). Also in this figure, four (4) HD-SDI cameras 120 are in communication (via coaxial cables 125) with the four (4) GMSL conversion modules 110, respectively.

It should be noted that the HD-SDI cameras 120 may be located at a distance away from the hardware enclosure 160. In one or more embodiments, the HD-SDI cameras 120 are mounted onto a vehicle (e.g., refer to 700 of FIG. 7). For these embodiments, the hardware enclosure 160 may be located far away from the HD-SDI cameras 120. In one or more embodiments, the vehicle may be an autonomous vehicle or a non-autonomous vehicle. In some embodiments, the vehicle may be an airborne vehicle (e.g., a drone, an unmanned aerial vehicle (UAV), or an aircraft), a space vehicle (e.g., a rocket or satellite) a terrestrial vehicle (e.g., an unmanned ground vehicle (UGV), an automobile, or a tank), or a marine vehicle (e.g., an unmanned surface vehicle (USV), a ship, or a boat).

In addition, it should be noted that in other embodiments, the disclosed system 100 may employ more or less than four HD-SDI cameras 120 than as shown in FIG. 1. In addition, the disclosed system 100 may employ more or less than four GMSL conversion modules 110 than as shown in FIG. 1.

During operation of the system 100, the HD-SDI cameras 120 record video, and transmit the corresponding video data to the GMSL conversion modules 110 via coaxial cables 125. The video data is 20-bit length serial HD-SDI video data (i.e. 20-bit length sequences for each pixel in series in HD-SDI protocol). The GMSL conversion modules 110 convert the video data from 20-bit length serial HD-SDI video data into 10-bit length serial GMSL video data (i.e. 10-bit length sequences in series in GMSL protocol).

Then, the GMSL conversion modules 110 transmit the 10-bit length serial GMSL video data to the GMSL to CSI conversion unit 140 via wires 115. The GMSL to CSI conversion unit 140 converts the 10-bit length serial GMSL video data to 10-bit length serial CSI video data (i.e. 10-bit length sequences in series in CSI protocol), which is compatible with the interface of the GPU 150. The GMSL to CSI conversion unit 140 transmits the 10-bit length serial CSI video data to the GPU 150 via a wire or trace 145. After receiving the 10-bit length serial CSI video data, the GPU 150 processes the 10-bit length serial CSI video data utilizing an efficient compression method (e.g., H.265/high efficiency video coding (HEVC)).

Figure 2:
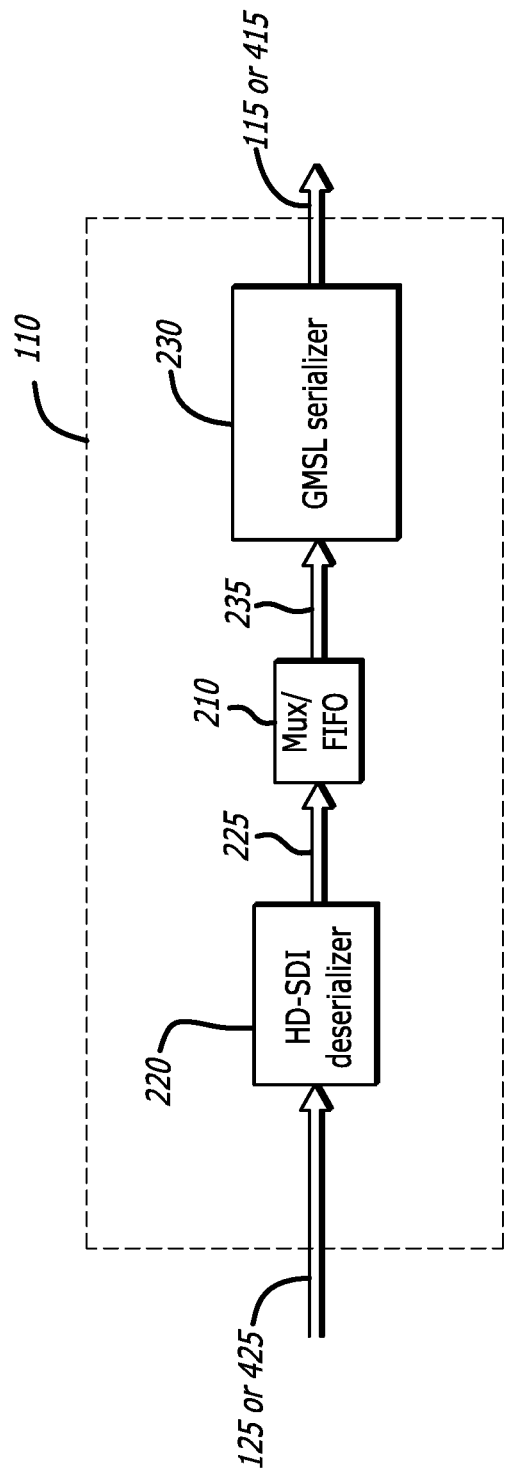
FIG. 2 is a diagram showing the details of a GMSL conversion module of FIGS. 1 and 4, in accordance with at least one embodiment of the present disclosure.
Figure 4:
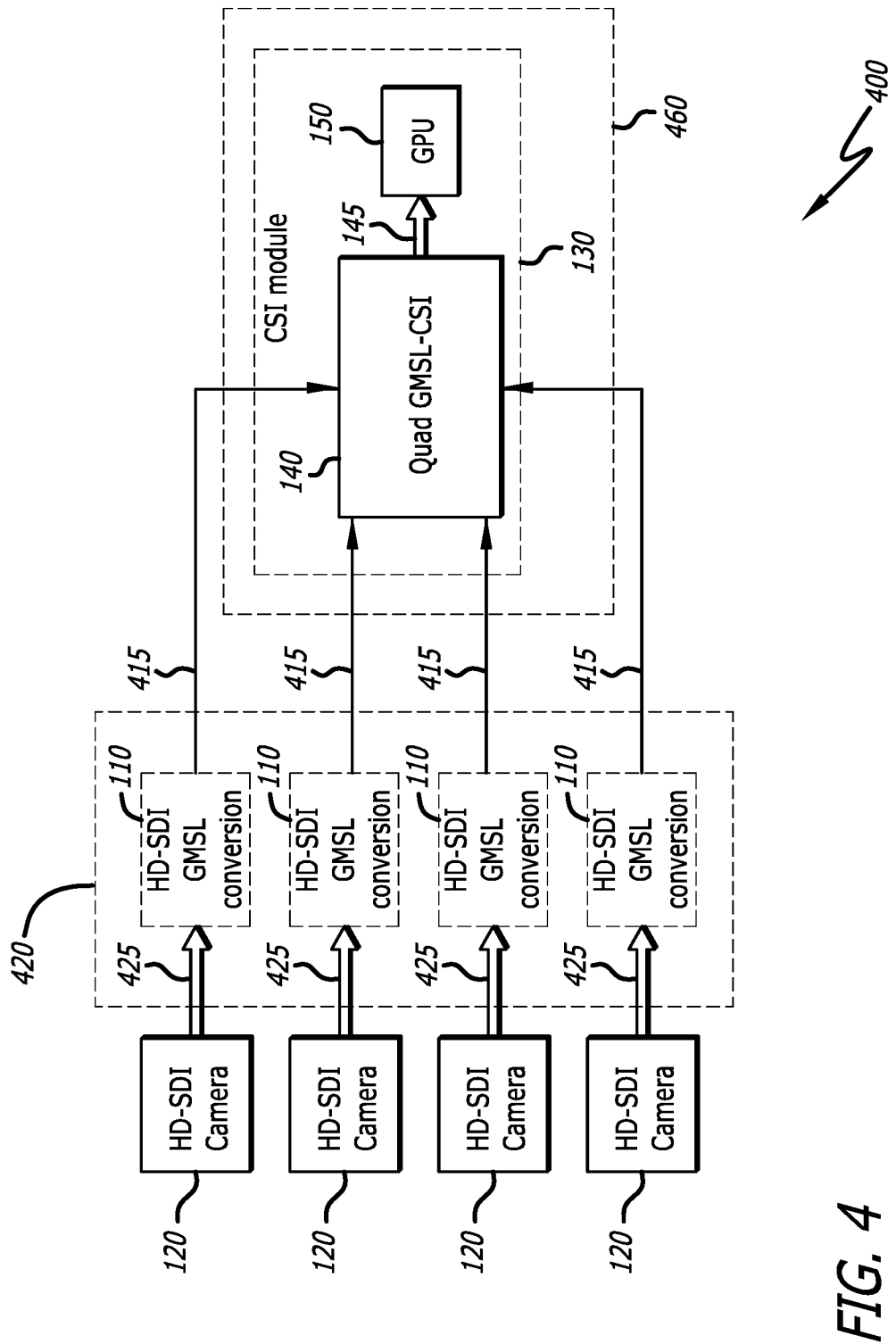
FIG. 4 is a diagram showing the disclosed system for multi-camera serial video data conversion for a GPU interface, where the GMSL conversion modules are located proximate the cameras, in accordance with at least one embodiment of the present disclosure.

FIG. 2 is a diagram showing the details of a GMSL conversion module 110 of FIGS. 1 and 4, in accordance with at least one embodiment of the present disclosure. In this figure, the GMSL conversion module 110 comprises a de-serializer (e.g., a LMH-0031 HD-SDI de-serializer IC chip) 220, a multiplexer/first-in first-out (MUX/FIFO) (e.g., a 20-bit to 10-bit MUX/FIFO IC chip) 210, and a GMSL serializer (e.g., a GMSL serializer Max96705 IC chip) 230 mounted on a carrier card (e.g., a daughterboard).

During operation of the GMSL conversion module 110, the de-serializer 220 of the GMSL conversion module 110 receives the 20-bit length serial HD-SDI video data from the HD-SDI cameras 120 via a coaxial cable 125 (refer to FIG. 1) or a wire 425 (refer to FIG. 4). The de-serializer 220 de-serializes the 20-bit length serial HD-SDI video data to produce 20-bit length parallel HD-SDI video data (i.e. 20-bit length sequences in parallel in HD-SDI protocol). Then, the de-serializer 220 transmits the 20-bit length parallel HD-SDI video data to the MUX/FIFO 210 via a wire or trace 225. The MUX/FIFO converts the 20-bit length parallel HD-SDI video data into 10-bit length parallel HD-SDI video data (i.e. 10-bit length sequences in parallel in HD-SDI protocol). Then, the MUX/FIFO transmits the 10-bit length parallel HD-SDI video data to the GMSL serializer 230 via a wire or trace 235. The GMSL serializer 230 serializes and converts the 10-bit length parallel HD-SDI video data into 10-bit length serial GMSL video data (i.e. 10-bit length sequences in series in GMSL protocol). The GMSL serializer 230 then outputs the 10-bit length serial GMSL video data via a wire 115 (refer to FIG. 1) or a coaxial cable 415 (refer to FIG. 4).

Figure 3:
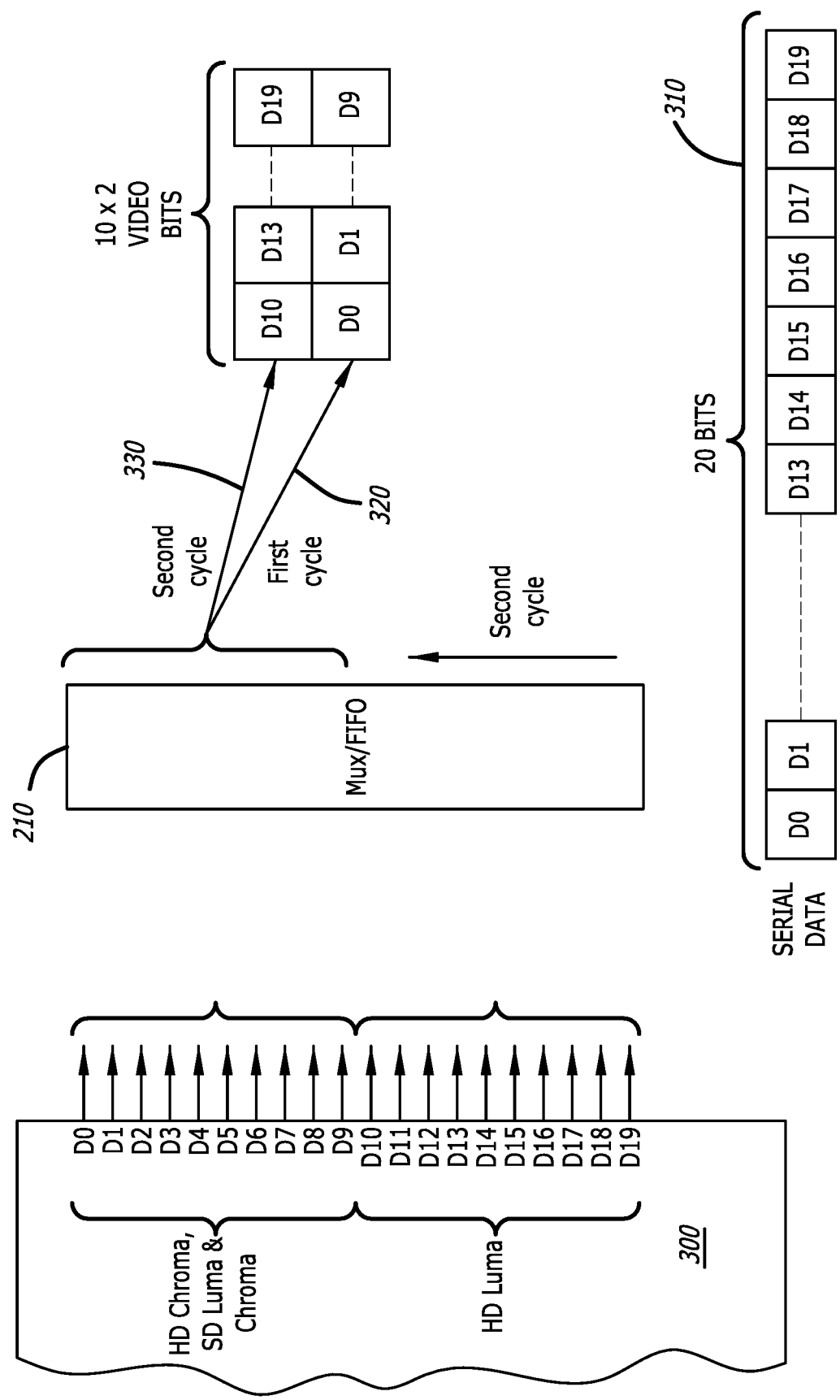
FIG. 3 is a diagram showing the details of the operation of the multiplexer/first-in first-out (MUX/FIFO) of FIG. 2, in accordance with at least one embodiment of the present disclosure.

FIG. 3 is a diagram showing the details of the operation of the multiplexer/first-in first-out (MUX/FIFO) 210 of FIG. 2, in accordance with at least one embodiment of the present disclosure. In this figure, an exemplary 20-bit sequence 300 that is generated by a HD-SDI camera for each pixel of video data is shown. The first ten bits (i.e. D0 to D9) of the 20-bit sequence 300 comprise data relating to the color (e.g., HD chroma, standard definition (SD) luma, and chroma) of the pixel. And, the second ten bits (i.e. D10 to D19) of the 20-bit sequence 300 comprise data relating to the intensity (e.g., HD luma) of the pixel.

During operation of the MUX/FIFO 210, after the MUX/FIFO 210 receives the 20-bit length parallel HD-SDI video data from the de-serializer 220 (refer to FIG. 2), the MUX/FIFO 210 converts the 20-bit length parallel HD-SDI video data into 10-bit length parallel HD-SDI video data via a shift register, which is driven off a video clock (not shown), of the MUX/FIFO 210. The shift register shifts the first 10 bits (i.e. D0 to D9) from the 20-bit length sequence 310 onto a first row during a first cycle 320 of the video clock, and shifts the second 10 bits (i.e. D10 to D19) from the 20-bit length sequence 310 onto a second row during a second cycle 330 of the video clock.

FIG. 4 is a diagram showing the disclosed system 400 for multi-camera serial video data conversion for a GPU 150 interface, where the GMSL conversion modules 110 are located proximate the cameras (e.g. HD-SDI cameras) 120 in accordance with at least one embodiment of the present disclosure. In this figure, the four (4) GMSL conversion modules 110 are located proximate the HD-SDI cameras 120 such that each of the GMSL conversion modules 110 is housed within the housing 600 (refer to FIG. 6) of their respective HD-SDI camera 120, such that each of the GMSL conversion modules 110 are mounted close to (e.g., less than one foot away) their respective HD-SDI camera 120, or such that all of the GMSL conversion modules 110 are mounted together within a hardware housing 420 that is mounted close to (e.g., less than one foot away) at least one of the HD-SDI cameras 120.

The CSI module 130 comprises a GMSL to CSI conversion unit (e.g., a Quad GMSL-CSI-2 (Max9286) integrated circuit (IC) chip) 140 and a GPU (e.g., an Nvidia TX1 GPU module) 150 mounted on a carrier card (e.g., a daughterboard), which is enclosed in a hardware enclosure 460. Also in this figure, the four (4) HD-SDI cameras 120 are in communication with the four (4) GMSL conversion modules 110, respectively. It should be noted that in other embodiments, the disclosed system 400 may employ more or less than four HD-SDI cameras 120 than as shown in FIG. 4. In addition, the disclosed system 400 may employ more or less than four GMSL conversion modules 110 than as shown in FIG. 4.

It should be noted that the HD-SDI cameras 120 and GMSL conversion modules 110 may be located at a distance away from the hardware enclosure 460. In one or more embodiments, the HD-SDI cameras 120 are mounted onto a vehicle (e.g., refer to 700 of FIG. 7). For these embodiments, the hardware enclosure 460 may be located far away from the HD-SDI cameras 120 and GMSL conversion modules 110. In one or more embodiments, the vehicle may be an autonomous vehicle or a non-autonomous vehicle. In some embodiments, the vehicle may be an airborne vehicle (e.g., a drone, an unmanned aerial vehicle (UAV), or an aircraft), a space vehicle (e.g., a rocket or satellite) a terrestrial vehicle (e.g., an unmanned ground vehicle (UGV), an automobile, or a tank), or a marine vehicle (e.g., an unmanned surface vehicle (USV), a ship, or a boat).

During operation of the system 400, the HD-SDI cameras 120 record video, and transmit the corresponding video data to the GMSL conversion modules 110 via wires 425. The video data is 20-bit length serial HD-SDI video data (i.e. 20-bit length sequences for each pixel in series in HD-SDI protocol). The GMSL conversion modules 110 convert the video data from 20-bit length serial HD-SDI video data into 10-bit length serial GMSL video data (i.e. 10-bit length sequences in series in GMSL protocol).

Then, the GMSL conversion modules 110 transmit the 10-bit length serial GMSL video data to the GMSL to CSI conversion unit 140 via coaxial cables 415. The GMSL to CSI conversion unit 140 converts the 10-bit length serial GMSL video data to 10-bit length serial CSI video data (i.e. 10-bit length sequences in series in CSI protocol), which is compatible with the interface of the GPU 150. The GMSL to CSI conversion unit 140 transmits the 10-bit length serial CSI video data to the GPU 150 via a wire or trace 145. After receiving the 10-bit length serial CSI video data, the GPU 150 processes the 10-bit length serial CSI video data utilizing an efficient compression method (e.g., H.265/high efficiency video coding (HEVC)).

Figure 5:
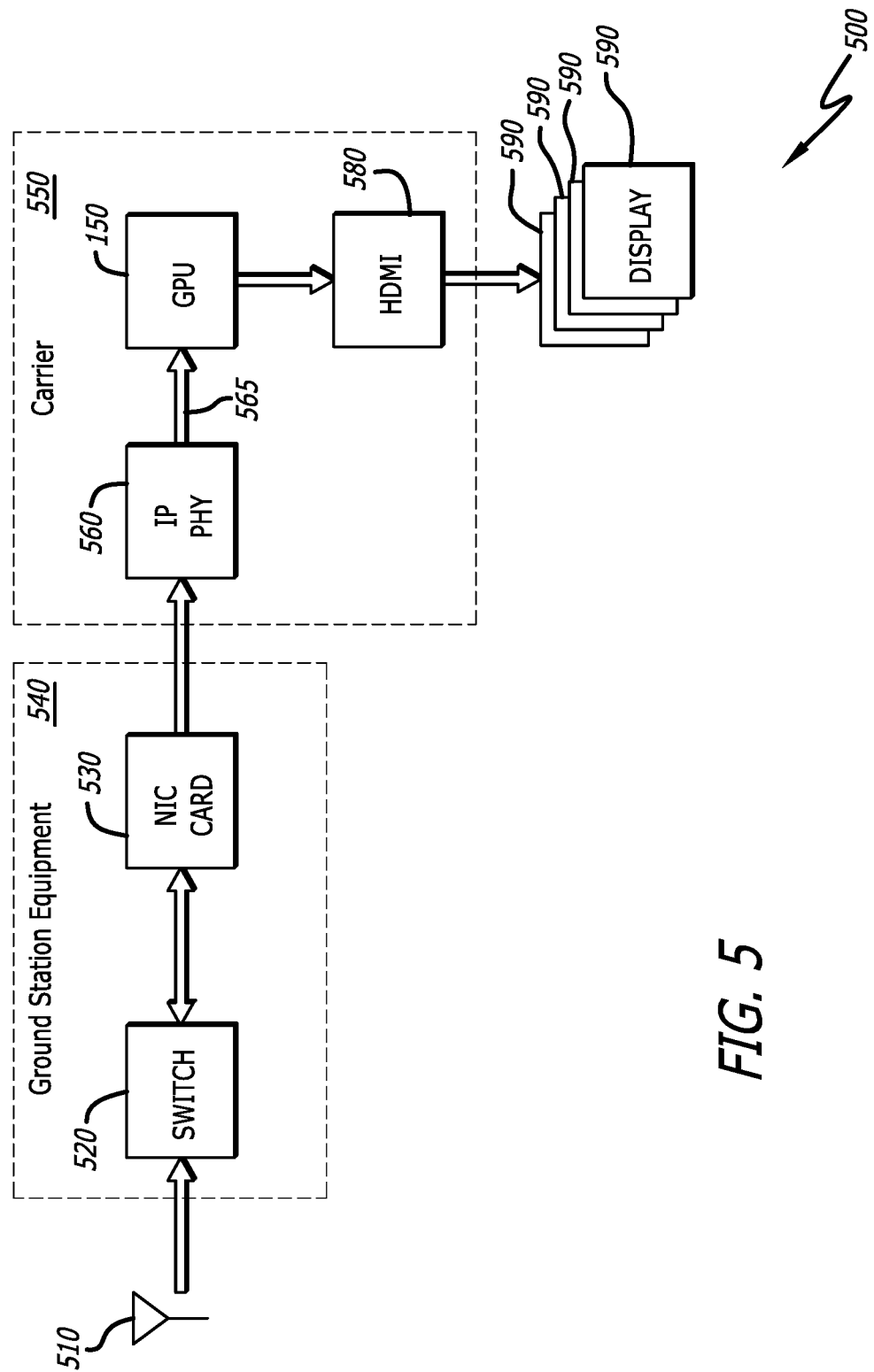
FIG. 5 is a diagram showing an exemplary video decoder system that may be employed by the disclosed system for multi-camera serial video data conversion for a GPU interface, in accordance with at least one embodiment of the present disclosure.

FIG. 5 is a diagram showing an exemplary video decoder system 500 that may be employed by the disclosed system 100, 400 for multi-camera serial video data conversion for a GPU 150 interface, in accordance with at least one embodiment of the present disclosure. For embodiments where the HD-SDI cameras 120 are mounted onto a vehicle (e.g., refer to 700 of FIG. 7), after the serial video data (e.g., 20-bit length serial video data in HD-SDI protocol) from the HD-SDI cameras 120 is converted into a GPU compatible format (e.g., 10-bit length serial video data in CSI protocol) for direct processing by a GPU 150, the GPU 150 processes the 10-bit length serial CSI video data to produce a moving pictures experts group (MPEG) data stream. The MPEG data stream is transmitted from an antenna (not shown) on the vehicle to an antenna 510 associated with a ground station comprising the video decoder system 500. The video decoder system 500 receives and processes the MPEG data stream.

During operation of the video decoder system 500, after the antenna 510 receives the MPEG data stream, the MPEG data stream passes through a switch 520 and network interface (NIC) controller card 530, which are part of the ground station equipment 540, to a processing module 550. The processing module 550 comprises an internet protocol physical layer (IP PHY) IC chip 560 and a GPU (e.g., an Nvidia TX1 GPU module) 150 mounted on a carrier card (e.g., a daughterboard).

After the processing module 550 receives the MPEG data stream, the IP PHY IC chip 560 parses the MPEG data stream into four different data streams, which are transmitted to the GPU 150 via a wire or trace 565. The GPU 150 processes the four different data streams and transmits the video data to four displays 590 via an HDMI cable 580 to display the video, which was captured by the four HD-SDI cameras 120 (refer to FIGS. 1 and 4).

Figure 6:
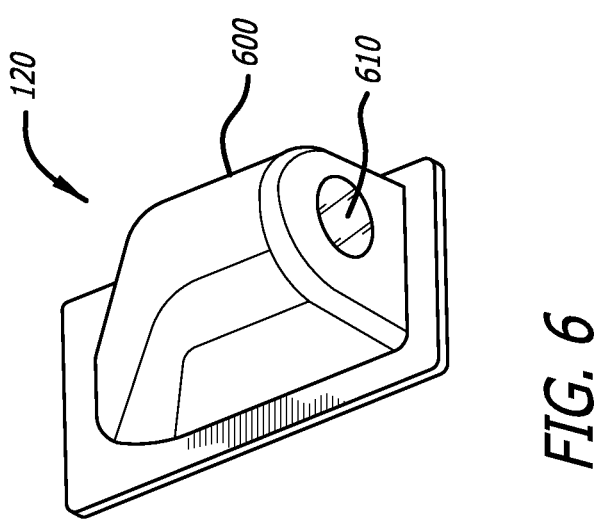
FIG. 6 is a diagram showing an exemplary camera that may be employed by the disclosed system for multi-camera serial video data conversion for a GPU interface, in accordance with at least one embodiment of the present disclosure.

FIG. 6 is a diagram showing an exemplary camera 120 that may be employed by the disclosed system for multi-camera serial video data conversion for a GPU 150 interface, in accordance with at least one embodiment of the present disclosure. In this figure, the camera 120 is shown to comprise a lens 610 and a housing 600. It should be noted that in other embodiments, the housing 600 of the camera 120 may be of a different shape than as depicted in FIG. 6. As previously mentioned above, in some embodiments, the GMSL conversion module 110 (refer to FIG. 4) of the disclosed system 400 (refer to FIG. 4) may be housed within the housing 600 of the camera 120.

Figure 7:
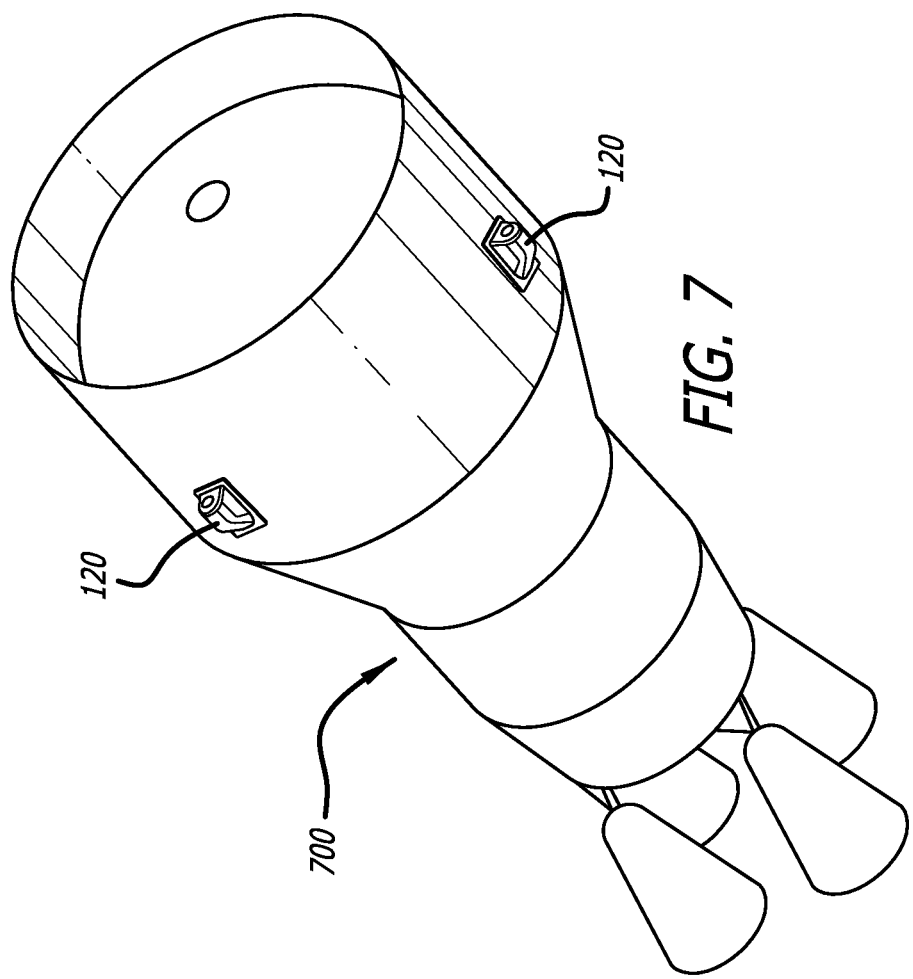
FIG. 7 is a diagram showing exemplary cameras mounted to an exterior surface of an exploration upper stage (EUS) rocket, in accordance with at least one embodiment of the present disclosure.

FIG. 7 is a diagram showing exemplary cameras 120 mounted to an exterior surface of an exploration upper stage (EUS) rocket 700, in accordance with at least one embodiment of the present disclosure. In this figure, cameras 120 are shown to be mounted on the surface of the exterior of a EUS rocket 700 (e.g., from the space launch system (SLS)). It should be noted that in other embodiments, the cameras 120 may be mounted onto different locations of the EUS rocket 700 than is shown in FIG. 7. In addition, it should be noted that more or less cameras 120 may be mounted onto the EUS rocket 700 than as depicted in FIG. 7.

Figure 8:
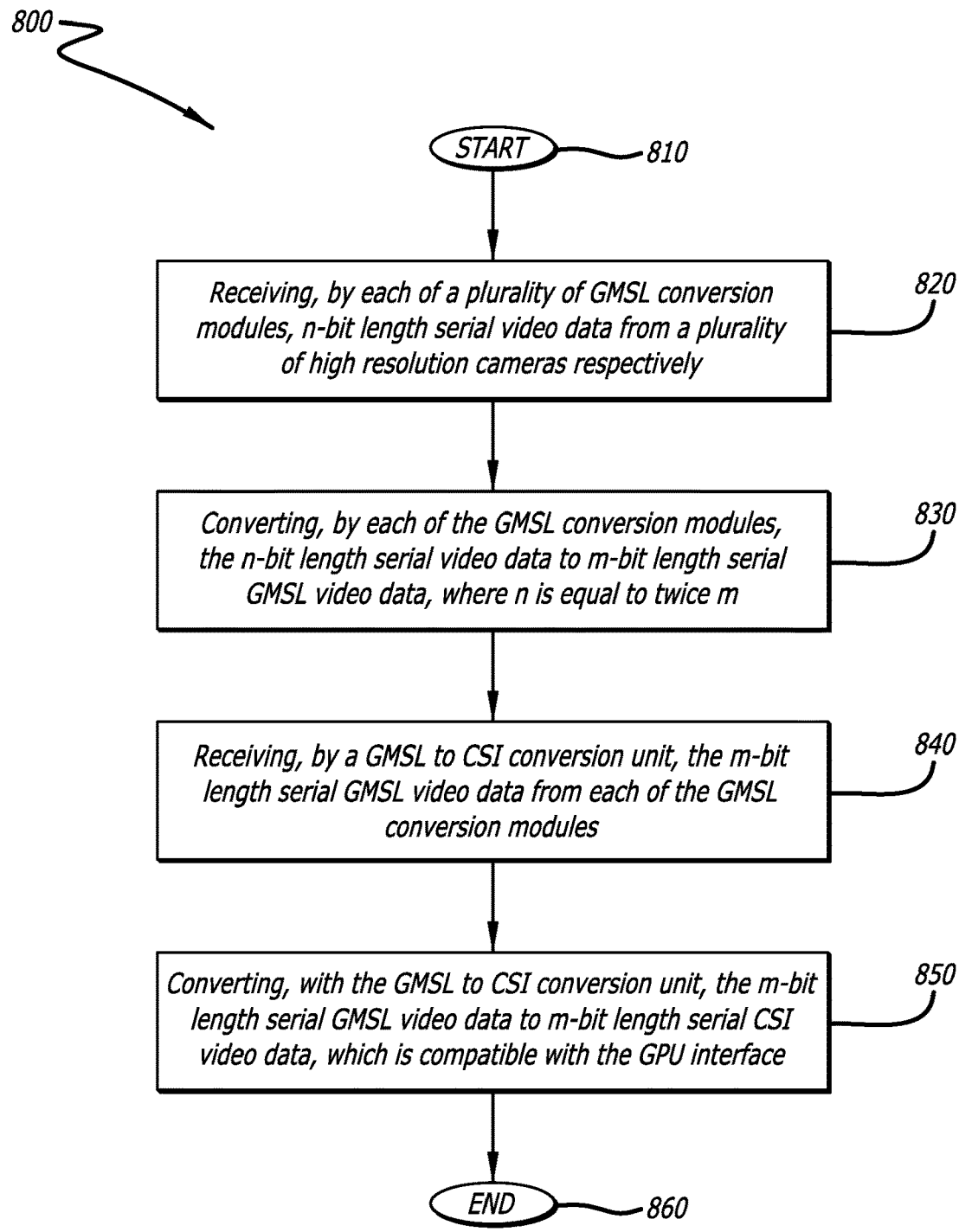
FIG. 8 is a flow chart showing the disclosed method for multi-camera serial video data conversion for a GPU interface, in accordance with at least one embodiment of the present disclosure.

FIG. 8 is a flow chart showing the disclosed method 800 for multi-camera serial video data conversion for a GPU interface, in accordance with at least one embodiment of the present disclosure. At the start 810 of the method 800, each of a plurality of GMSL conversion modules receives n-bit length serial video data from a plurality of high-resolution cameras respectively 820. Then, each of the plurality of GMSL conversion modules converts the n-bit length serial video data to m-bit length serial GMSL video data, where n is equal to twice m 830. A GMSL to CSI conversion unit then receives the m-bit length serial GMSL video data from each of the GMSL conversion modules 840. Then, the GMSL to CSI conversion unit converts the m-bit length serial GMSL video data to m-bit length serial CSI video data, which is compatible with the GPU interface 850. Then, the method 800 ends 860.

Although particular embodiments have been shown and described, it should be understood that the above discussion is not intended to limit the scope of these embodiments. While embodiments and variations of the many aspects of the invention have been disclosed and described herein, such disclosure is provided for purposes of explanation and illustration only. Thus, various changes and modifications may be made without departing from the scope of the claims.

Where methods described above indicate certain events occurring in certain order, those of ordinary skill in the art having the benefit of this disclosure would recognize that the ordering may be modified and that such modifications are in accordance with the variations of the present disclosure. Additionally, parts of methods may be performed concurrently in a parallel process when possible, as well as performed sequentially. In addition, more parts or less part of the methods may be performed.

Accordingly, embodiments are intended to exemplify alternatives, modifications, and equivalents that may fall within the scope of the claims.

Although certain illustrative embodiments and methods have been disclosed herein, it can be apparent from the foregoing disclosure to those skilled in the art that variations and modifications of such embodiments and methods can be made without departing from the true spirit and scope of the art disclosed. Many other examples of the art disclosed exist, each differing from others in matters of detail only. Accordingly, it is intended that the art disclosed shall be limited only to the extent required by the appended claims and the rules and principles of applicable law.

I claim:
1. A method for converting serial video data for a graphics processing unit (GPU) interface, the method comprising:
receiving, by each of a plurality of gigabit multimedia serial link (GMSL) conversion modules, n-bit length serial video data from a plurality of high-resolution cameras respectively;

converting, by each of the GMSL conversion modules, the n-bit length serial video data to m-bit length serial GMSL video data, wherein n is equal to twice m;

receiving, by a GMSL to camera series interface (CSI) conversion unit, the m-bit length serial GMSL video data from each of the GMSL conversion modules; and converting, with the GMSL to CSI conversion unit, the m-bit length serial GMSL video data to m-bit length serial CSI video data, which is compatible with the GPU interface.

2. The method of claim 1, wherein the converting, by each of the GMSL conversion modules, of the n-bit length serial video data to the m-bit length serial GMSL video data comprises:

receiving, by a de-serializer of each of the GMSL conversion modules, the n-bit length serial video data;

de-serializing, with the de-serializer, the n-bit length serial video data to produce n-bit length parallel video data;

converting, with a multiplexer/first-in first-out (MUX/FIFO) of each of the GMSL conversion modules, the n-bit length parallel video data to m-bit length parallel video data; and serializing and converting, with a GMSL serializer of each of the GMSL conversion modules, the m-bit length parallel video data to produce m-bit length serial GMSL video data.

3. The method of claim 1, wherein each of the high-resolution cameras is a high definition-serial data interface (HD-SDI) camera.

4. The method of claim 1, wherein n is equal to 20, and m is equal to 10.

5. The method of claim 1, wherein at least one of the high-resolution cameras is mounted to a vehicle.

6. The method of claim 5, wherein the vehicle is an autonomous vehicle.

7. The method of claim 5, wherein the vehicle is one of an airborne vehicle, a space vehicle, a terrestrial vehicle, or a marine vehicle.

8. The method of claim 1, wherein each of the plurality of GMSL conversion modules are located proximate the plurality of high-resolution cameras respectively.

9. The method of claim 1, wherein the plurality of GMSL conversion modules are located proximate the GMSL to CSI conversion unit.

10. The method of claim 1, wherein the GMSL to CSI conversion unit is located proximate the GPU interface.

11. A system for converting serial video data for a graphics processing unit (GPU) interface, the system comprising:

a plurality of high-resolution cameras;

a plurality of gigabit multimedia serial link (GMSL) conversion modules to each receive n-bit length serial video data from the plurality of high-resolution cameras respectively, and to each convert the n-bit length serial video data to m-bit length serial GMSL video data, wherein n is equal to twice m; and a GMSL to camera series interface (CSI) conversion unit to receive the m-bit length serial GMSL video data from each of the GMSL conversion modules, and to convert the m-bit length serial GMSL video data to m-bit length serial CSI video data, which is compatible with the GPU interface.

12. The system of claim 11, wherein each of the GMSL conversion modules comprises:

a de-serializer to receive the n-bit length serial video data and to de-serialize the n-bit length serial video data to produce n-bit length parallel video data;

a multiplexer/first-in first-out (MUX/FIFO) to convert the n-bit length parallel video data to m-bit length parallel video data; and a GMSL serializer to serialize and convert the m-bit length parallel video data to produce m-bit length serial GMSL video data.

13. The system of claim 11, wherein each of the high-resolution cameras is a high definition-serial data interface (HD-SDI) camera.

14. The system of claim 11, wherein n is equal to 20, and m is equal to 10.

15. The system of claim 11, wherein at least one of the high-resolution cameras is mounted to a vehicle.

16. The system of claim 15, wherein the vehicle is an autonomous vehicle.

17. The system of claim 15, wherein the vehicle is one of an airborne vehicle, a space vehicle, a terrestrial vehicle, or a marine vehicle.

18. The system of claim 11, wherein each of the plurality of GMSL conversion modules are located proximate the plurality of high-resolution cameras respectively.

19. The system of claim 11, wherein the plurality of GMSL conversion modules are located proximate the GMSL to CSI conversion unit.

20. A system for converting serial video data for a graphics processing unit (GPU) interface, the system comprising:

a high-resolution camera;

a gigabit multimedia serial link (GMSL) conversion module to receive n-bit length serial video data from the high-resolution camera, and to convert the n-bit length serial video data to m-bit length serial GMSL video data, wherein n is equal to twice m; and a GMSL to camera series interface (CSI) conversion unit to receive the m-bit length serial GMSL video data from the GMSL conversion module, and to convert the m-bit length serial GMSL video data to m-bit length serial CSI video data, which is compatible with the GPU interface.

* * * * *